April 23, 1940.   J. SCHOR ET AL   2,198,092

SWIVEL,

Filed Nov. 16, 1937

INVENTORS
JOSEPH SCHOR
JOHN R. SKOVERSKI
BY Charles J. Evans
THEIR ATTORNEY

Patented Apr. 23, 1940

2,198,092

UNITED STATES PATENT OFFICE 2,198,092

SWIVEL

Joseph Schor, San Francisco, and John R. Skoverski, Oakland, Calif.; said Skoverski assignor to said Schor Application November 16, 1937, Serial No. 174,796

1 Claim. (Cl. 24—236)

Our invention relates to swivels used in fishing tackle; and the broad object of the invention is to provide a swivel having an improved releasable fastener and an improved connection between the rotatable parts of the swivel.

The invention possesses other objects and features of advantage, some of which, with the foregoing, will be set forth in the following description of our invention. It is to be understood that we do not limit ourselves to this disclosure of species of our invention, as we may adopt variant embodiments thereof within the scope of the claim.

Referring to the drawing.

In terms of broad inclusion, the swivel embodying our invention comprises a body, and a fastener having an end projecting into the body and turned back to form a holding loop in said body. The body is preferably tubular, and in one form of our construction a portion of the body is flattened against the holding loop of the fastener, while in a modified construction a portion of the body is tapered to receive the holding loop. In the flattened construction a lip is provided on the body to form a hook, and the fastener is preferably of spring wire having a free end engageable with the hook. An eyelet is also provided, having a shank with an enlarged end disposed in the other end of the tubular body, and the end edges of the body are crimped inwardly to provide a socket.

Figure 1:
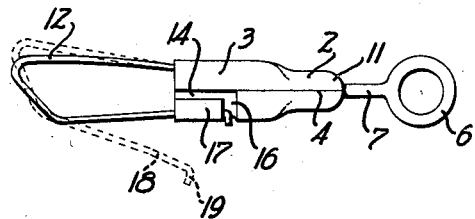
Figure 1 is a side elevational view of a swivel embodying the improvements of our invention, the dotted lines indicating the open position of the releasable fastener.
Figure 2:
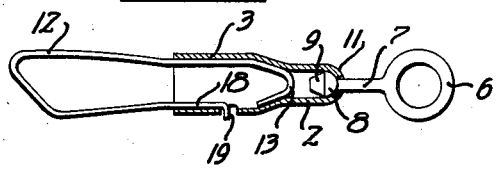
Figure 2 is a longitudinal sectional view of the same.

In greater detail, and referring to Figures 1 and 2 of the drawing, the swivel embodying our invention comprises a tubular body 2 of metal having a flattened end portion 3. Body 2 may be of any suitable rust-proof metal, and may be shaped from sheet metal with a seam 4, or may be made from a piece of seamless tubing.

The upper portion of the swivel comprises an eyelet 6, preferably stamped from sheet metal, and having a shank 7 projecting into an end of the tubular body 2. The inner end of the shank is enlarged to provide a ball, preferably comprising an upper spherical portion 8 and a lower tapered portion 9. Edges 11 of the tube are crimped inwardly to provide a socket for the ball, so that eyelet 6 swivels freely on body 2. Tapered portion 9 of the ball bears against the sides of the tube when the eyelet swings sideways, and limits lateral movement of the eyelet.

A releasable fastener 12 is provided on body 2, and is preferably shaped from spring wire, such as piano wire. One end of the wire projects into the flattened portion 3 of the body, and the inner end is turned back to provide a hook or loop 13 arranged so that the sides of the loop lie along and bear against the edges of the flattened body portion. The wire fastener is then firmly secured by pressing the sides of the flattened body together inside the holding loop to form the metal around the wire. By this arrangement the hook or loop 13 is completely embraced, and a construction is provided which makes it practically impossible to pull the fastener out.

A longitudinal slot 14 and transverse slot 16 are cut in one side of the flattened body portion to form a lip 17, and this lip is not pressed in but is left spaced from the opposite side to form a hook. This hook receives the free end 18 of the fastener, and the tip 19 of the wire is bent out to engage the upper edge of the hook. By this inter-engaging means the fastener is securely held, and resists any tendency of a direct pull on the fastener to dislodge it. At the same time, the flattened body is easily grasped and the fastener is readily unhooked to apply a leader, hook or other attachment.

Figure 3:
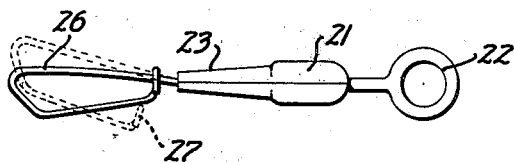
Figure 3 is a view similar to that of Figure 1, showing a modified form of swivel construction.
Figure 4:
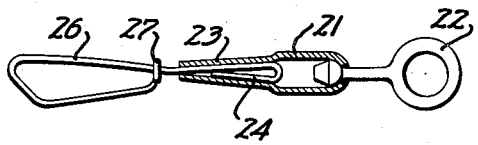
Figure 4 is a longitudinal sectional view of the same.

The modification of our invention shown in Figures 3 and 4 comprises a tubular body 21 having a swivelly connected eyelet 22. The lower portion 23 of the body in this case is tapered to receive the looped portion 24 of the wire fastener 26. Tapered portion 23 of the body is pressed firmly about the holding loop 24; and the taper of the body, being reverse to that of the loop, provides a connection which positively grips the fastener 26. The free end of the fastener is preferably provided with a hook 27 for engaging the main portion of the fastener. By this arrangement the fastener may be readily unhooked to apply a leader, hook or other attachment.

We claim:

A swivel comprising a tubular body having the upper edges of the tube crimped inwardly to provide a swivel socket and having the side walls of the lower portions of the tube flattened to provide a holder for a fastener, and a spring wire fastener having an end projecting into the tubular body and clamped between the flattened walls of the tube, one of said flattened walls having a longitudinal slot extending from the lower edge of the wall and having a transverse slot extending from the first slot to provide a hook forming lip, the other end of the wire fastener being engageable with said lip.

JOSEPH SCHOR.
JOHN R. SKOVERSKI.